United States Patent [19]

Chirico

[11] 4,084,944

[45] Apr. 18, 1978

[54] PURE DISTILLATE RECOVERY SYSTEM

[75] Inventor: Anthony Nicholas Chirico, Short Hills, N.J.

[73] Assignee: Ecodyne Corporation, Lincolnshire, Ill.

[21] Appl. No.: 724,812

[22] Filed: Sep. 20, 1976

[51] Int. Cl.² .............................................. B01D 19/00
[52] U.S. Cl. ............................................. 55/27; 55/42; 55/50; 55/185; 55/208
[58] Field of Search .................... 55/27, 40–44, 55/49, 50, 80, 181–188, 208; 202/197; 203/10, 40

[56] References Cited

U.S. PATENT DOCUMENTS

| Re. 25,504 | 12/1963 | Glasgow | 55/42 |
|---|---|---|---|
| 1,938,991 | 12/1933 | Wulff | 55/40 |
| 2,995,202 | 8/1961 | Glasgow | 55/40 |
| 3,255,574 | 6/1966 | Glasgow | 55/42 |
| 3,789,579 | 2/1974 | El-Hindi | 55/50 |

Primary Examiner—Charles N. Hart
Assistant Examiner—Robert H. Spitzer
Attorney, Agent, or Firm—Joel E. Siegel; Charles M. Kaplan

[57] ABSTRACT

In the condensing operation of a waste concentration system, water vapor is condensed, by cooling, into liquid condensate which is reboiled so as to drive off and strip gas that has been redissolved into such condensate. The stripped and driven off gas is directly recombined with the undissolved gas without being mixed with the main body of vapors. The resulting mixture is further cooled to remove the remaining portion of water vapor after which the noncondensible gas stream is filtered and cooled.

9 Claims, 1 Drawing Figure

U.S. Patent        April 18, 1978        4,084,944
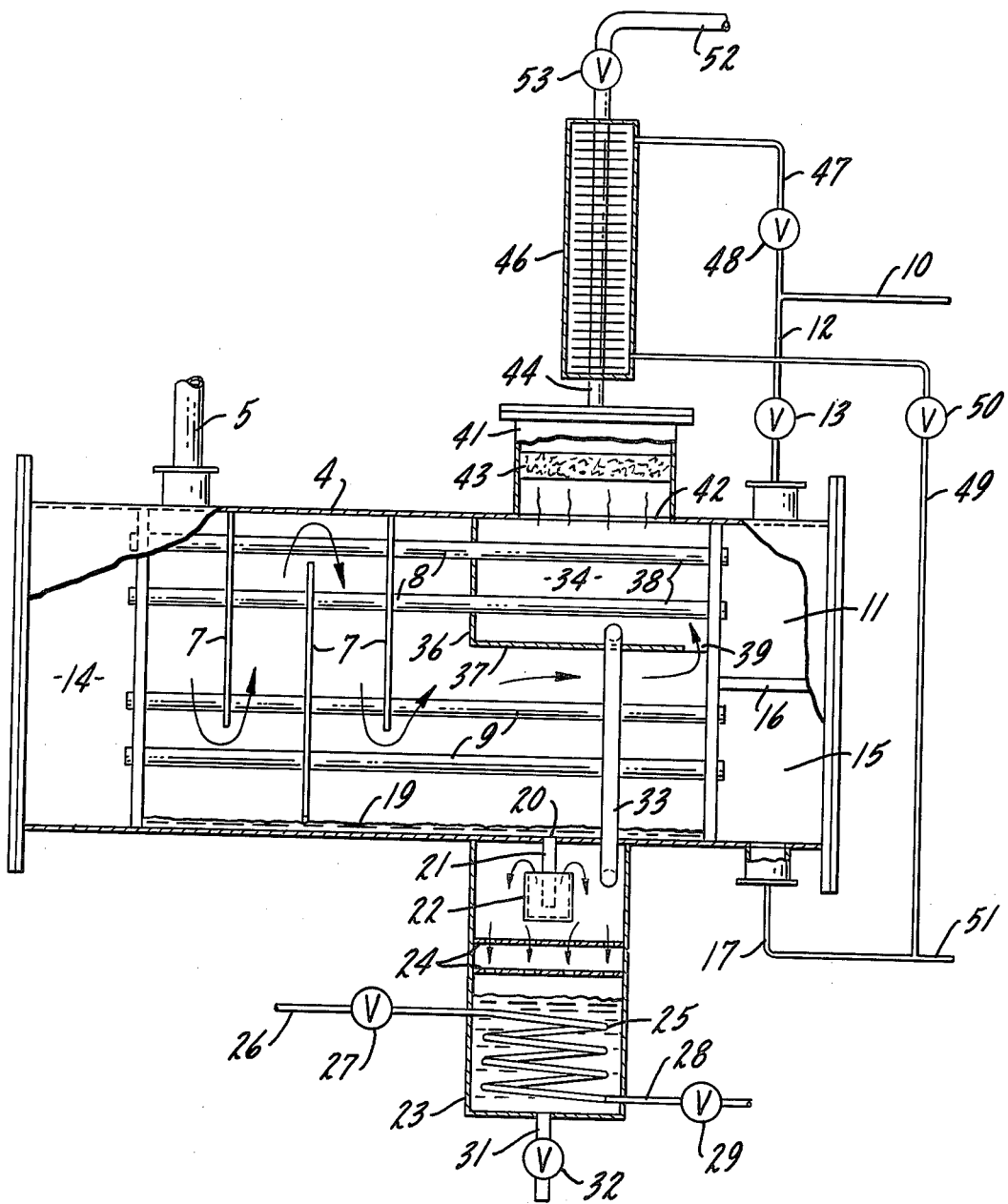

PURE DISTILLATE RECOVERY SYSTEM

BACKGROUND OF THE INVENTION

The processing of radioactive liquid wastes for disposal requires concentration of such wastes to the smallest volume practical. When aqueous radioactive wastes are being processed, the volatility of some isotopes, such as radioactive iodine gas, precludes them from remaining in the concentrate solution resulting in the release of these gases along with the boiled off water or vapor stream. During the subsequent condensing of these water vapors, a small portion of these volatile gases are often redissolved in the liquid condensate that is otherwise safe for disposal or reuse. This can lower the decontamination factor of such liquid condensate to an undesirable level.

SUMMARY OF THE INVENTION

Accordingly, it is an object of this invention to provide improved methods and apparatus for separating gases from water vapor and liquids.

Another object is to provide for the segregation of a gas that prevents such gas from being redissolved in a liquid effluent.

Another object is to provide methods and apparatus for processing cooled and unsaturated volatile radioactive isotopes.

Another object is to provide for the separation and capture of a highly valuable or highly dangerous gas that is mixed with water vapor or other relatively easily condensible gases.

Another object is to provide gas separation methods and apparatus which are relatively efficient, durable, low-cost, simple to adjust and maintain, and which do not possess defects found in similar prior art methods and apparatus.

Other objects and advantages of the invention will be revealed by the specification and claims, and the scope of the invention will be set forth in the claims.

DESCRIPTION OF THE DRAWING

The FIGURE is a partially cross-sectional schematic representation of a vapor condensing gas separator in accordance with this invention.

DESCRIPTION OF THE INVENTION

The drawing shows a system for separating volatile gases, such as a radioactive iodine isotope, from a mixture with other relatively easily condensible gases, such as water vapor. Such a mixture could, for example, be gases discharged at atmospheric to 10 p.s.i.g. and 200°–230° F. from the low pressure gas outlet in the upper portion of the liquid-gas separator vessel of application for U.S. Letters Patent Ser. No. 710,945, filed Aug. 2, 1976, and assigned to the same assignee as this invention. The mixture of gas and liquid vapor enters condensation tank 4 through an inlet conduit 5. A plurality of spaced vertical baffles 7 define a serpentine path for vapors and gas flowing through tank 4. Upper heat transfer pipes 8 and lower heat transfer pipes 9 span the interior of tank 4 and pass through baffles 7. A heat transfer fluid, such as water at 85°–110° F from a feed line 10, enters inlet header 11 in tank 4 through an inlet branch line 12 controlled by valve means 13. The heat transfer fluid flows from header 11 through the upper pipes 8 into a distribution header 14 and then through the lower pipes 9 into a discharge header 15, which is separated from inlet header 11 by a plate 16. The heated fluid leaves condensation tank 4 through a discharge line 17 and is recirculated as a source of heat energy or otherwise disposed of.

As the vapor-gas mixture criss-crosses heat transfer pipes 8 and 9, water vapor is cooled to liquid condensate 19 which falls to the bottom of tank 4. Such condensed vapors flow through an outlet opening 20 into a drain tube 21 surrounded by a seal pot 22 in a boiler tank 23. The condensate 19 overflows pot 22 and flows to the bottom of tank 23 through a series of horizontal, perforated plates 24 spanning the interior of tank 23. Means for heating a liquid, such as steam coil 25, in the bottom of tank 23 boils the condensate. Steam (e.g. at 25 p.s.i.g. and 267° F) enters coil 25 through an inlet line 26 controlled by valve means 27 and exits through an outlet line 28 controlled by valve means 29. Such boiling drives off any of the volatile gases which were redissolved in the liquified vapors 19 in the bottom of tank 23; boiling also produces water vapor that flows up through the perforations in plates 24 countercurrent to the downward flow of liquid condensate 19, and thereby strips dissolved gas from condensate 19. Seal pot 22 prevents the gas and water vapor from tank 23 from entering condensation tank 4 where they would recombine with the main body of gas and water vapor in tank 4. Pure liquid distillate is discharged from the bottom of tank 23 through a discharge outlet 31 controlled by valve means 32, which maintains the proper operating pressure level in tank 23 by automatic regulation of the discharge rate.

The gas and water vapor resulting from boiling the liquid condensate 19 in tank 23 are vented through a conduit pipe 33 directly to a low temperature chamber 34 in condensation tank 4. Low temperature chamber 34 is defined by walls 36 and 37 that span tank 4 adjacent inlet header 11. Walls 36 and 37 enclose the portions 38 of upper pipes 8 that are directly connected to inlet header 11 and hence through which the heat transfer fluid from line 12 first flows. The temperature in chamber 34 is lower (e.g. by 5°–10° F) than that of the rest of tank 4 because the heat transfer fluid flowing directly from header 11 through pipe portions 38 has not been heated by the main body of gas and condensing vapors. Wall 37 is spaced from header 11 to define an entrance opening 39 in chamber 34 for entry of partially cooled vapors and gas from tank 4 and provide a drain opening through which liquid condensing in chamber 34 escapes into tank 4. Thus low temperature chamber 34 provides a polishing treatment for condensing relatively unconcentrated water vapor from the cooled gas that is about to exit from tank 4.

An open bottomed filter housing 41 attached to the top of tank 4 communicates with low temperature chamber 34 through a hole 42 in the top of tank 4. One or more wire mesh liquid droplet filter pads 43 span the interior of housing 41 directly above chamber 34. Any tiny droplets of liquid entrained in the upwardly flowing gas impinge on pads 43 and coalesce into large drops that fall under the influence of gravity to the bottom of chamber 34, from whence they drain into condensation tank 4 through opening 39.

Gas leaves filter housing 41 through a finned tube heat transfer pipe 44 which is enclosed in a container 46. A heat transfer fluid, such as water from feed line 10, flows into container 46 through a branch line 47 controlled by valve means 48 and leaves through a discharge line 49 controlled by valve means 50. Line 49 may connect with line 17 to a common drain line 51. The temperature of the gas flowing through heat transfer pipe 44 is lowered significantly (e.g. to 120° F), thereby ensuring that water vapor or liquid will not escape with the chilled gas that exits through an outlet line 52 controlled by valve means 53.

The chilled gas may be disposed of or processed further. In the case of radioactive gases, such as iodine isotope, hydrogen, ammonia, krypton, and xenon, the gases are compressed at elevated pressure to reduce bulk and then stored in a shielded environment until their radioactivity has receded to a tolerable level.

The components of the system should be made from a corrosion resistant alloy, such as stainless steel or titanium, or from fiberglass reinforced plastic. Wire mesh pads 43 may be made from metallic alloys, Teflon or fiberglass.

It has thus been shown that by the practice of this invention, essentially complete separation of a dangerous gas can be achieved in an economical manner. The process steps employed are simple and easily controlled. The apparatus is relatively compact and makes efficient use of energy by having the coolest gas in condensation tank 4 contact the coolest heat transfer pipes in low temperature chamber 34 just before the gas leaves tank 4. Also, countercurrent flow between condensed liquid 19 and vapors in tank 23 employ such vapors to strip dissolved gas from the condensate, thus making dual process use of the energy required to drive dissolved gas out of condensate 19.

While the present invention has been described with reference to a particular embodiment, it is not intended to illustrate or describe herein all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

What is claimed is:

1. A method for disposing of the radioactive waste gas of a gas-water vapor mixture, comprising:
   (a) cooling said mixture so as to condense said water vapor;
   (b) passing any uncondensed water vapor and said radioactive gas to a chamber where said mixture is cooled to a lower temperature;
   (c) flowing condensed water vapors downwardly to and through a sealed boiler; heating said condensed water vapors in said sealed boiler so as to drive off radioactive gas dissolved in said condensed water vapors and also to produce additional water vapors which flow upwardly countercurrent to said condensed water vapors and thereby strip radioactive gas from said condensed water vapors; passing said radioactive gas and additional water vapors directly from said sealed boiler to said chamber without recombining with said mixture;
   (d) filtering liquid droplets from the radioactive gas and any uncondensed water vapors exiting from said chamber;
   (e) chilling the filtered radioactive gas; and
   (f) recovering the condensed water vapors and the chilled radioactive gas at different locations.

2. Apparatus for separating the gas from the liquid vapor of a gas-liquid vapor mixture, comprising:
   (a) means for cooling said mixture so as to condense said liquid vapor comprising a condensation tank containing a plurality of heat transfer pipes through which a heat transfer fluid flows;
   (b) a low temperature chamber in said cooling means for further cooling of any uncondensed liquid vapor and said gas, said low temperature chamber comprising means in said tank enclosing the portions of said heat transfer pipes first entered by said heat transfer fluid;
   (c) means for collecting condensed liquid vapor and passing same into a boiler; means in said boiler for heating said condensed liquid vapor so as to drive off any gas dissolved therein; conduit means for passing said gas directly from said boiler to said low temperature chamber;
   (d) means for filtering liquid droplets from the gas exiting from said low temperature chamber; and
   (e) means for chilling the filtered gas.

3. The invention defined in claim 2, wherein said boiler is beneath said condensation tank, and said means for passing said condensed liquid vapors into said boiler comprises a seal pot in the upper end of said boiler and drain tube in the bottom of said condensation tank.

4. The invention defined in claim 2, wherein said means for filtering comprises a housing on said condensation tank with an open bottom directly above said low temperature chamber and a wire mesh pad spanning the interior of said housing.

5. The invention defined in claim 2, wherein a plurality of perforated plates span the inside of said boiler and condensed liquid vapors flow over and downwardly through said preforated plates above said heating means, which produces additional vapors that flow upwardly through said perforated plates countercurrent to said condensed liquid vapors, thereby stripping dissolved gas from said condensed liquid vapors.

6. The invention defined in claim 2, wherein said means in said tank enclosing portions of said heat transfer pipes comprises walls spanning the inside said tank, and one of said walls is spaced from a portion of said tank so as to define a passage through which uncondensed liquid and vapor enter said low temperature chamber.

7. Apparatus for disposing of the radioactive waste gas of a gas-water vapor mixture, comprising:
   (a) a condensation tank containing a plurality of heat transfer pipes through which a heat transfer fluid flows for cooling said mixture so as to condense said water vapor;
   (b) a low temperature chamber in said tank comprising means enclosing the portions of said heat transfer pipes first entered by said heat transfer fluid for further cooling of any uncondensed water vapor and said radioactive gas;
   (c) means for collecting condensed water vapor and passing same into a boiler; means for heating said condensed water vapor so as to drive off any radioactive gas dissolved therein; conduit means for passing said radioactive gas directly from said boiler to said low temperature chamber without recombining with said mixture;
   (d) means for filtering liquid droplets from the radioactive gas exiting from said low temperature chamber; and
   (e) means for chilling the filtered radioactive gas.

8. Apparatus for separating the gas from the liquid vapor of a gas-liquid vapor mixture, comprising:
   (a) a condensation tank containing a plurality of heat transfer pipes through which a heat transfer fluid flows for cooling said mixture so as to condense said liquid vapor, and a plurality of baffles defining a serpentine path through which said mixture flows as it is cooled; and (b) a low temperature chamber in said condensation tank for further cooling of any uncondensed liquid vapor and said gas comprising walls inside said condensation tank enclosing the portions of said heat transfer pipes first entered by said heat transfer fluid, and means defining a passage through which uncondensed liquid vapor and gas enter said low temperature chamber and condensed liquid vapor flows from said low temperature chamber into said condensation tank.

9. The invention defined in claim 8, further comprising a boiler and means for collecting condensed liquid vapor in said condensation tank and passing same into said boiler; means in said boiler for heating said condensed liquid vapor so as to drive off any gas dissolved therein; and conduit means for passing the driven off gas directly from said boiler to said low temperature chamber without recombining with said mixture.

* * * * *